(12) United States Patent
Chen et al.

(10) Patent No.: US 10,410,563 B2
(45) Date of Patent: Sep. 10, 2019

(54) DISPLAY PARAMETER ADJUSTING METHOD AND ELECTRONIC DEVICE EMPLOYING THE METHOD

(71) Applicants: Kai-Yi Chen, Taipei (TW); Yu-Hao Wu, Taipei (TW); Chun-Yu Yang, Taipei (TW); Chia-Shin Weng, Taipei (TW)

(72) Inventors: Kai-Yi Chen, Taipei (TW); Yu-Hao Wu, Taipei (TW); Chun-Yu Yang, Taipei (TW); Chia-Shin Weng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 315 days.

(21) Appl. No.: 15/169,738

(22) Filed: Jun. 1, 2016

(65) Prior Publication Data

US 2016/0351166 A1 Dec. 1, 2016

Related U.S. Application Data

(60) Provisional application No. 62/168,927, filed on Jun. 1, 2015.

(51) Int. Cl.
| | | |
|---|---|---|
| *H04N 5/225* | (2006.01) | |
| *G09G 3/20* | (2006.01) | |
| *G03B 17/08* | (2006.01) | |

(52) U.S. Cl.
CPC ............... *G09G 3/20* (2013.01); *G03B 17/08* (2013.01); *G09G 2320/0233* (2013.01);
(Continued)

(58) Field of Classification Search
CPC .......... G03B 17/08; G02B 7/28; G01S 7/064; G09G 5/10; A61B 3/113; A61B 5/4561
(Continued)

(56) References Cited

U.S. PATENT DOCUMENTS 4,086,579 A * 4/1978 Easter ..................... G01S 7/064
315/378
5,826,113 A * 10/1998 Nonaka ..................... G02B 7/28
396/25
(Continued)

FOREIGN PATENT DOCUMENTS

| CN | 101532946 | 9/2009 |
| CN | 202975895 | 6/2013 |

(Continued)

OTHER PUBLICATIONS

"Office Action of China Counterpart Application," dated Apr. 25, 2018, p. 1-p. 6.

*Primary Examiner* — Abdul-Samad A Adediran
(74) *Attorney, Agent, or Firm* — JCIPRNET

(57) ABSTRACT

The present invention provides a display parameter adjusting method and an electronic device employing the method. The electronic device includes a display, a light source and a light receiver. The display parameter adjusting method includes: emitting a light beam to the light receiver by the light source; calculating a turbidity of a location of the display according to a first light intensity of the light beam received by the light receiver, wherein a propagation direction of the light beam emitted by the light source is parallel to a displaying surface of the display, and the location is beneath a water surface; and adjusting the display parameter according to the turbidity.

24 Claims, 15 Drawing Sheets

(52) U.S. Cl.
CPC . *G09G 2320/066* (2013.01); *G09G 2320/068* (2013.01); *G09G 2320/0626* (2013.01); *G09G 2354/00* (2013.01); *G09G 2360/144* (2013.01); *G09G 2380/00* (2013.01)

(58) Field of Classification Search
USPC ............... 315/378; 345/156, 690; 348/207.1; 396/25; 600/587
See application file for complete search history.

(56) References Cited

U.S. PATENT DOCUMENTS

| | | | | |
|---|---|---|---|---|
| 2008/0151057 A1* | 6/2008 | Takita | ................... | G03B 17/08 |
| | | | | 348/207.1 |
| 2011/0141010 A1* | 6/2011 | Sakata | .................. | A61B 3/113 |
| | | | | 345/156 |
| 2013/0110004 A1* | 5/2013 | McLane | ............... | A61B 5/4561 |
| | | | | 600/587 |
| 2014/0015865 A1* | 1/2014 | Kim | ......................... | G09G 5/10 |
| | | | | 345/690 |

FOREIGN PATENT DOCUMENTS

| | | |
|---|---|---|
| CN | 103295558 | 9/2013 |
| TW | 256880 | 9/1995 |
| TW | 200532639 | 10/2005 |

* cited by examiner

DISPLAY PARAMETER ADJUSTING METHOD AND ELECTRONIC DEVICE EMPLOYING THE METHOD

CROSS-REFERENCE TO RELATED APPLICATION

This application claims the priority benefits of U.S. provisional application Ser. No. 62/168,927, filed on Jun. 1, 2015. The entirety of the above-mentioned patent application is hereby incorporated by reference herein and made a part of this specification.

BACKGROUND OF THE INVENTION

1. Field of the Invention

The present invention relates to a display parameter adjusting method and an electronic device employing the method, and particularly relates to a display parameter adjusting method that adjusts a display parameter according to the turbidity in water and an electronic device employing the method.

2. Description of Related Art

With the evolution of the waterproof function of the electronic device, many electronic devices such as smart phones or smart watches may be operated in the water. When the user is in ongoing underwater activities, the display parameters of the electronic device such as the display brightness, contrast ratio, character size and so on are fixed, and this may cause the user unable to clearly identify the display content of the display of the electronic device in turbid water or dark environments. Therefore, it is a goal of effort for related technicians of the field to dynamically adjust the display parameters of the display of the electronic device according to the change of the surrounding turbidity and the surrounding brightness beneath the water surface so that the user may clearly identify the content of the display of the electronic device.

SUMMARY OF THE INVENTION

The present invention provides a display parameter adjusting method and an electronic device employing the method to adjust the display parameters of the display of the electronic device according to the change of the surrounding turbidity and the surrounding brightness beneath the water surface so that the user may clearly identify the display content of the display of the electronic device in turbid or clearer underwater environments.

The present invention provides a display parameter adjusting method, adapted to an electronic device, the electronic device includes a display, a light source and a light receiver, the display parameter adjusting method includes: emitting a light beam to the light receiver by the light source; calculating a turbidity of a location of the display according to a first light intensity of the light beam received by the light receiver, wherein a propagation direction of the light beam emitted by the light source is parallel to a displaying surface of the display, and the location is located beneath a water surface; and adjusting a display parameter of the display according to the turbidity.

In an embodiment of the invention, the display parameter adjusting method further includes: calculating the surrounding brightness of the location of the display, and adjusting the display parameter of the display according to the turbidity and the surrounding brightness.

In an embodiment of the invention, the electronic device further includes a reflecting element disposed on the display, and the step of calculating the surrounding brightness of the location of the display includes: refracting an ambient light to the light receiver through the reflecting element, and calculating the surrounding brightness according to a second light intensity of the refracted ambient light received by the light receiver.

In an embodiment of the invention, the reflecting element is disposed on the propagation direction of the light beam, and the reflecting element is a transflective mirror.

In an embodiment of the invention, the light source is a directional light source.

In an embodiment of the present invention, the display parameter includes a display brightness, and when the turbidity is not less than a turbidity threshold, the processor increases the display brightness.

In an embodiment of the present invention, when the turbidity is less than the turbidity threshold, the processor further determines whether the surrounding brightness is greater than a brightness threshold, and when the surrounding brightness is greater than the brightness threshold, the processor increases the display brightness.

In an embodiment of the present invention, the display parameter includes a character size, and when the turbidity is not less than a turbidity threshold, the processor enlarges the character size.

In an embodiment of the invention, when the turbidity is less than a turbidity threshold, the processor further determines whether the surrounding brightness is greater than a brightness threshold, and when the surrounding brightness is greater than the brightness threshold, the processor scales down the character size.

In an embodiment of the present invention, the display parameter includes a contrast ratio, and when the turbidity is not less than a turbidity threshold, the processor increases the contrast ratio.

In an embodiment of the present invention, when the turbidity is less than the turbidity threshold, the processor further determines whether the surrounding brightness is greater than a brightness threshold, and if the surrounding brightness is greater than the brightness threshold, the processor increases the contrast ratio.

In an embodiment of the present invention, the contrast ratio includes a user interface contrast ratio and a character contrast ratio.

The invention provides an electronic device, including a display, a processor, a light source, a light receiver. The processor is coupled with the display. The light source and the light receiver are coupled with the processor. The processor instructs the light source to emit a light beam to the light receiver. The processor calculates a turbidity of a location of the display according to a first light intensity of the light beam received by the light receiver. A propagation direction of the light beam emitted by the light source is parallel to a displaying surface of the display, and the location is located beneath a water surface. The processor adjusts a display parameter of the display according to the turbidity.

In an embodiment of the invention, the processor calculates the surrounding brightness of the location of the display, wherein the processor adjusts the display parameter of the display according to the turbidity and the surrounding brightness.

In an embodiment of the invention, the electronic device further includes the reflecting element disposed on the display, wherein the reflecting element refracts the ambient light to the light receiver, wherein the processor calculates the surrounding brightness according to a second light intensity of the refracted ambient light received by the light receiver.

In an embodiment of the invention, the reflecting element is disposed on the propagation direction of the light beam, and the reflecting element is a transflective mirror.

In an embodiment of the present invention, the light source is a directional light source.

In an embodiment of the present invention, the display parameter includes display brightness, and when the turbidity is not less than a turbidity threshold, the processor increases the display brightness.

In an embodiment of the present invention, when the turbidity is less than the turbidity threshold, the processor further determines whether the surrounding brightness is greater than a brightness threshold, and when the surrounding brightness is greater than the brightness threshold, the processor increases the display brightness.

In an embodiment of the present invention, the display parameter includes a character size, and when the turbidity is not less than a turbidity threshold, the processor enlarges the character size.

In an embodiment of the present invention, when the turbidity is less than a turbidity threshold, the processor further determines whether the surrounding brightness is greater than a brightness threshold, and when the surrounding brightness is greater than the brightness threshold, the processor scales down the character size.

In an embodiment of the present invention, the display parameter includes a contrast ratio, and when the turbidity is not less than a turbidity threshold, the processor increases the contrast ratio.

In an embodiment of the present invention, when the turbidity is less than the turbidity threshold, the processor further determines whether the surrounding brightness is greater than a brightness threshold, and if the surrounding brightness is greater than the brightness threshold, the processor increases the contrast ratio.

In an embodiment of the present invention, the contrast ratio includes a user interface contrast ratio and a character contrast ratio.

Based on the above, the display parameter adjusting method and the electronic device employing the method may calculate the turbidity of the electronic device beneath the water surface according to the emission of the light beam from the light source of the electronic device to the light receiver, calculate the surrounding brightness according to the refraction of the ambient light to the light receiver by the reflecting element, and dynamically adjust the display parameter of the display according to the turbidity and the surrounding brightness.

To make the above features and advantages of the invention more comprehensible, several embodiments accompanied with drawings are described in detail as follows.

DESCRIPTION OF THE EMBODIMENTS

Same element may have the same reference symbol throughout the specification. In addition, the size of each of the elements of the plurality of figures in the invention may be illustrated arbitrarily. For example, in the plurality of figures, the size of the light source, light receiver, and reflecting element may be exaggerated for clear illustration.

Figure 1:
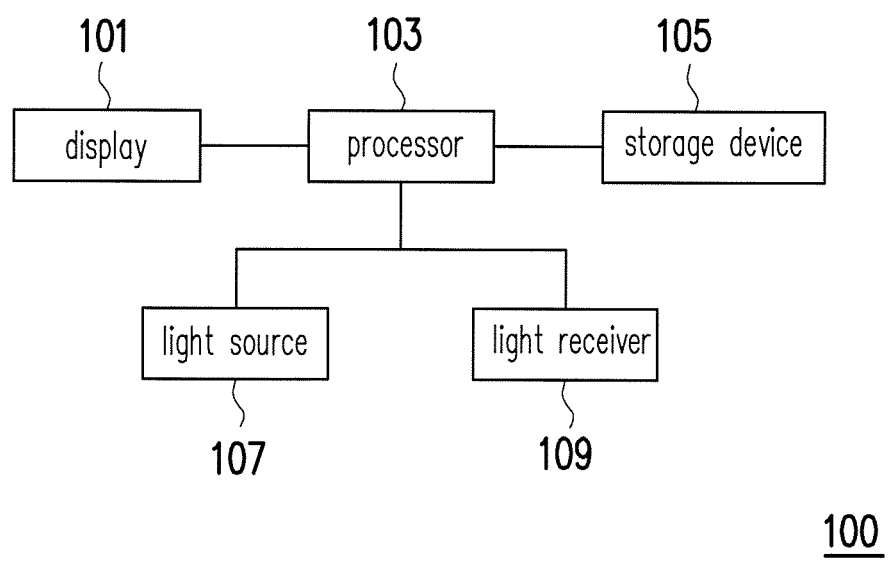
FIG. 1 is a block diagram of the electronic device according to an embodiment of the invention.

FIG. 1 is a block diagram of the electronic device according to an embodiment of the invention.

Please referring to FIG. 1, the electronic device 100 of the invention includes a display 101, a processor 103, storage device 105, a light source 107, and a light receiver 109. The electronic device 100 may be a portable or wearable electronic device such as a smart phone, smart watch and so on, and has a waterproof function. The display 101 may be a thin film transistor liquid crystal display, light emitting diode display, organic light emitting diode display or other similar devices. The processor 103 may be a central processing unit (CPU), a microprocessor, a digital signal processor (DSP), a programmable controller, an application specific integrated circuit (ASIC), a programmable logic device (PLD), or other similar devices. The storage device 105 may be random access memory (RAM), read-only memory (ROM), flash memory, compact flash (CF) memory card, secure digital (SD) memory card, micro SD memory card, memory stick (MS) or other similar devices. The light source 107 may be a laser LED lamp having a directional characteristic or other similar devices. The light receiver 109 may be a photoelectric sensor, LED receiving sensor, infrared (IR) receiving sensor or other similar devices.

Figure 2A:
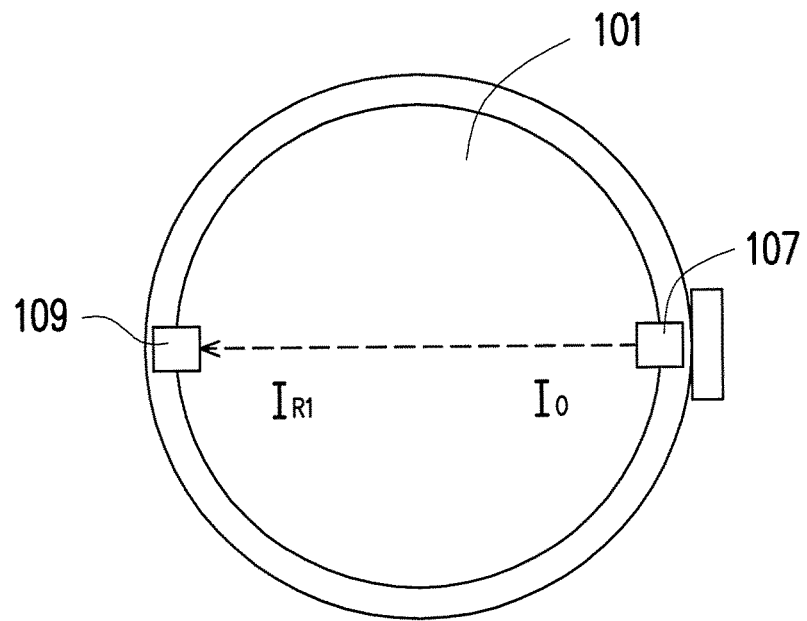
FIG. 2A is a schematic top view of the electronic device according to an embodiment of the invention.
Figure 2B:
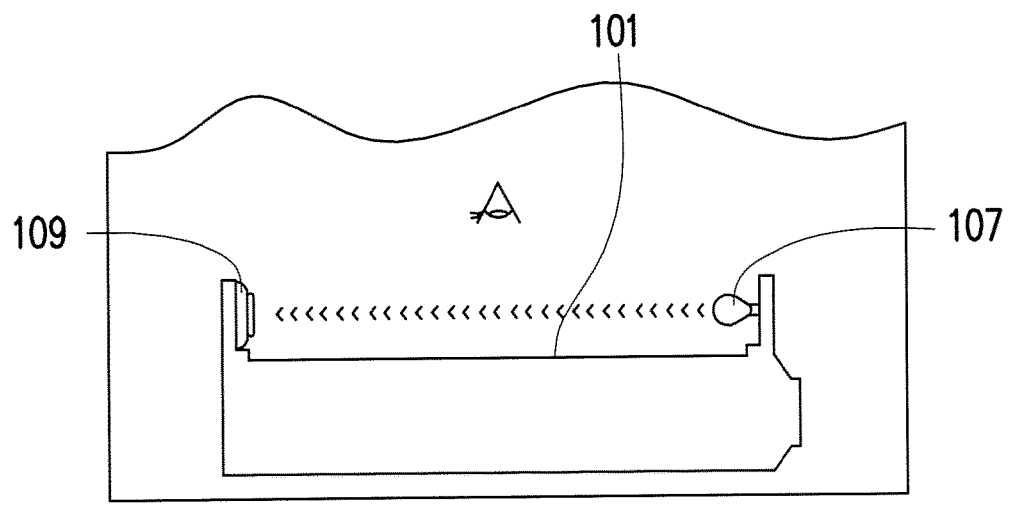
FIG. 2B is a schematic side view of the electronic device according to an embodiment of the invention.

FIG. 2A is a schematic top view of the electronic device according to an embodiment of the invention. FIG. 2B is a schematic side view of the electronic device according to an embodiment of the invention.

Referring to FIGS. 1, 2A and 2B, the light source 107 emits a light beam with a light intensity $I_O$ to the light receiver 109 and the propagation direction of the light beam is parallel to the displaying surface of the display 101. When the light receiver 109 receives the light beam emitted by the light source 107, the processor 103 may calculate the turbidity of the location of the display 101 according to the light intensity $I_{R1}$ (also known as first light intensity) of the light beam received by the light receiver 109, and adjust the display parameter of the display 101 according to the turbidity. In an embodiment, the processor 103 may search the light intensity-turbidity correspondence table in the storage device 105 according to the light intensity $I_{R1}$, to acquire the turbidity of the location of the display 101, and adjust the display parameter of the display 101 such as the display brightness, contrast ratio, character size and so on according to the turbidity. In another embodiment, the processor 103 may also search the light intensity-turbidity correspondence table in the storage device 105 according to the ratio of the light intensity $I_{R1}$ and the light intensity $I_O$, $I_{R1}/I_O$, to acquire the turbidity of the location of the display 101, wherein the smaller the ratio is, the smaller the light intensity of the light beam received by the light receiver 109 is, therefore, the greater the turbidity of the location of the display 101 is.

Figure 3A:
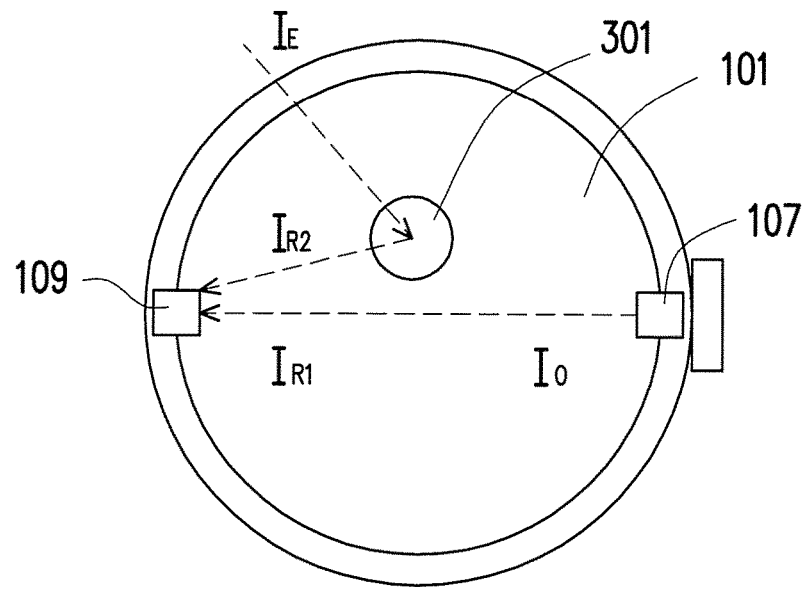
FIG. 3A is a schematic top view of the electronic device according to another embodiment of the invention.
Figure 3B:
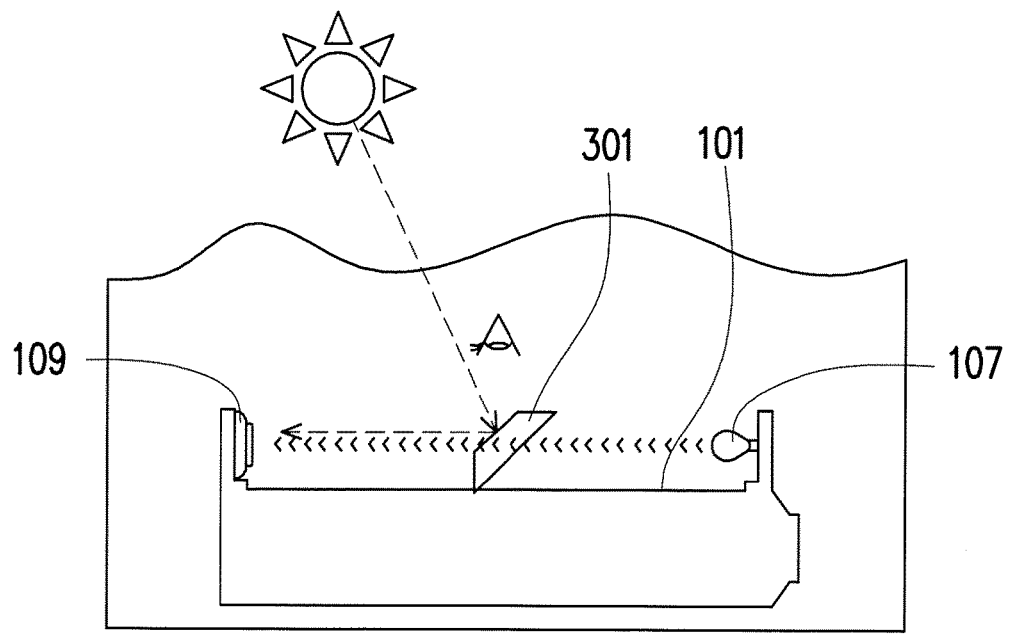
FIG. 3B is a schematic side view of the electronic device according to another embodiment of the invention.

FIG. 3A is a schematic top view of the electronic device according to another embodiment of the invention. FIG. 3B is a schematic side view of the electronic device according to another embodiment of the invention.

Referring to FIGS. 3A and 3B, the difference between the present embodiment and the embodiments of FIGS. 2A and 2B lies in that the electronic device 100 further includes the reflecting element 301 disposed on the display 101. The ambient light with a light intensity $I_E$ may be refracted to the light receiver 109 through the reflecting element 301. The light intensity of the ambient light received by the light receiver 109 is $I_{R2}$ (also known as the second light intensity). Therefore, the light receiver 109 receives light beams with a light intensity of $I_{R1}+I_{R2}$. In the embodiment, a filth function=$f(I_{R1}+I_{R2})$ may be defined, wherein the filth represents the integrated parameter of the surrounding brightness and the turbidity under the water surface. Specifically, the processor 103 may search the light intensity-filth correspondence table in the storage device 105 according to the light intensity $I_{R1}+I_{R2}$ received by the light receiver 109, to acquire the filth of the location of the display 101, and adjust the display parameter of the display 101 such as the display brightness, contrast ratio, character size and so on according to the turbidity.

Figure 4A:
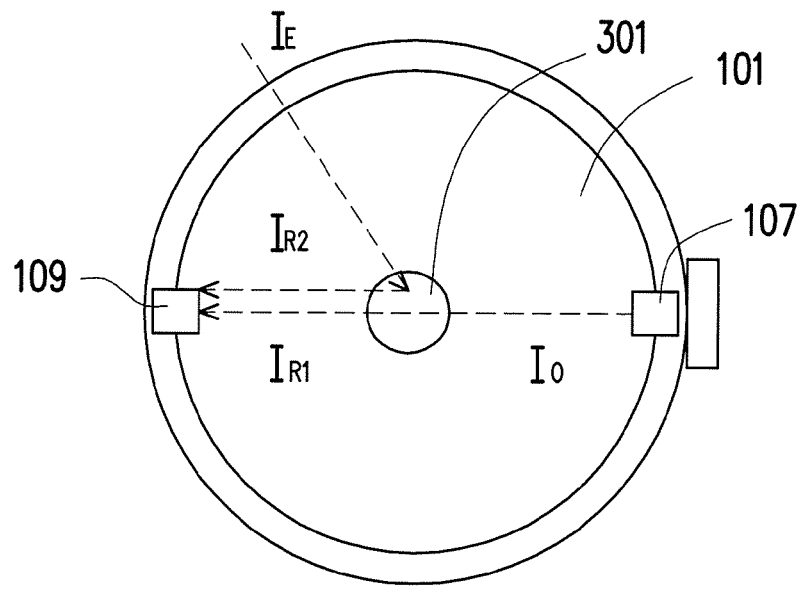
FIG. 4A is a schematic top view of the electronic device according to another embodiment of the invention.
Figure 4B:
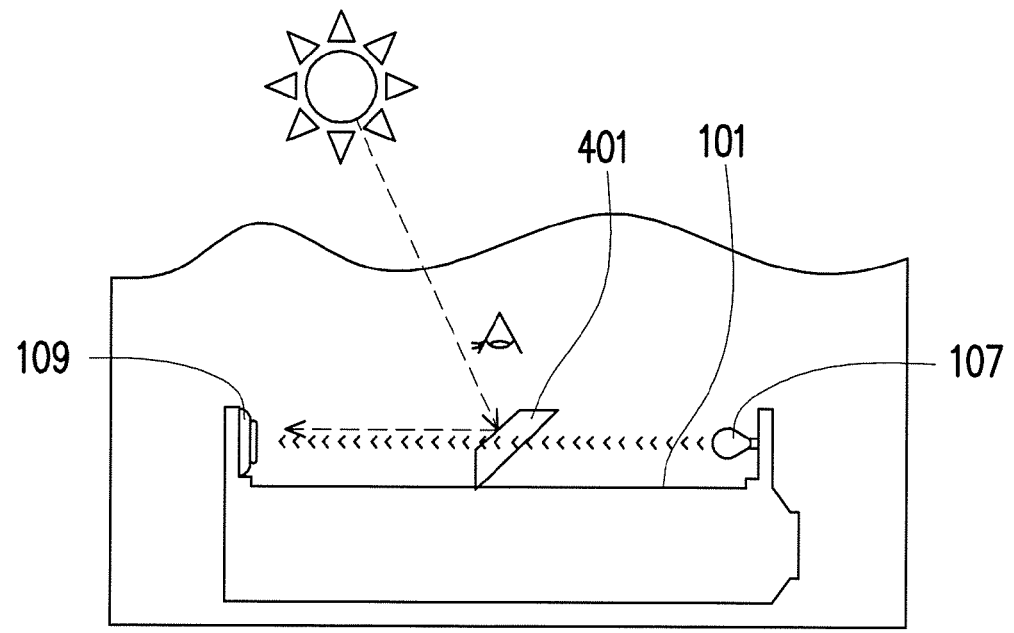
FIG. 4B is a schematic side view of the electronic device according to another embodiment of the invention.

FIG. 4A is a schematic top view of the electronic device according to another embodiment of the invention. FIG. 4B is a schematic side view of the electronic device according to another embodiment of the invention.

Referring to FIGS. 4A and 4B, the difference between the present embodiment and the embodiments of FIGS. 3A and 3B lies in that the reflecting element 401 is disposed on the propagation direction of the light beam between the light source 107 and the light receiver 109. For example, the reflecting element 401 may be disposed on the center of the display 101 of the electronic device 100. In order not to block the propagation of the light beam emitted by the light source 107, the reflecting element 401 may be a transflective mirror. The ambient light with a light intensity $I_E$ may be refracted to the light receiver 109 through the reflecting element 401. The light intensity of the ambient light received by the light receiver 109 is $I_{R2}$. Therefore, the light receiver 109 receives light beams with a light intensity of $I_{R1}+I_{R2}$. In the embodiment, a filth function=$f(I_{R1}+I_{R2})$ may be defined, wherein the filth represents the integrated parameter of the surrounding brightness and the turbidity under the water surface. Specifically, the processor 103 may search the light intensity-filth correspondence table in the storage device 105 according to the light intensity $I_{R1}+I_{R2}$ received by the light receiver 109, to acquire the filth of the location of the display 101, and adjust the display parameter of the display 101 such as the display brightness, contrast ratio, character size and so on according to the turbidity.

Figure 5A:
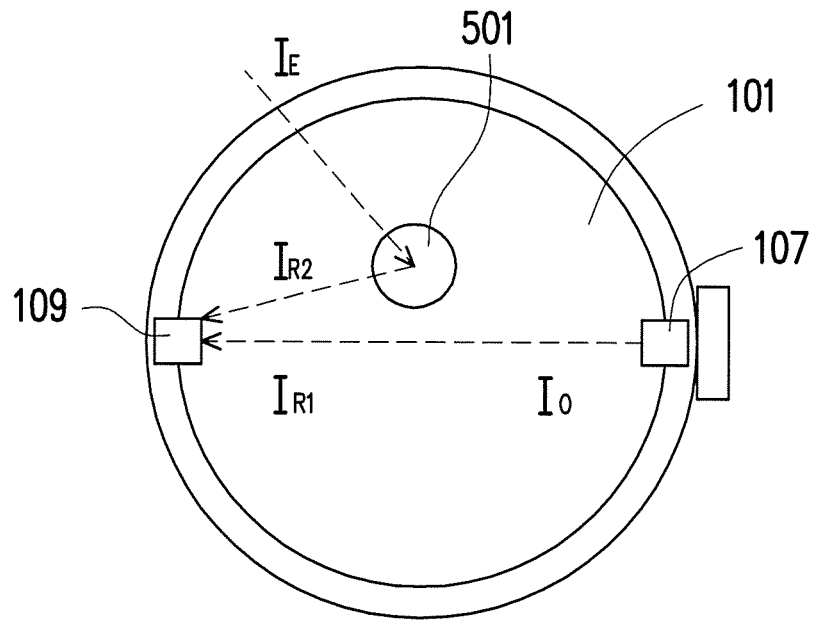
FIG. 5A and FIG. 5B are schematic top views of the electronic device according to another embodiment of the invention.
Figure 5B:
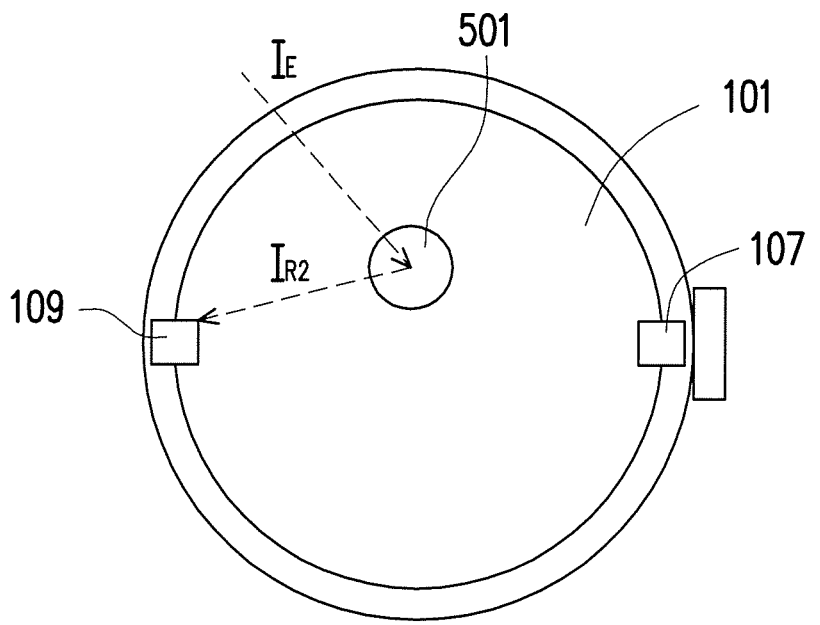

FIG. 5A and FIG. 5B are schematic top views of the electronic device according to another embodiment of the invention.

Referring to FIG. 5A and FIG. 5B, in the embodiment, the turbidity and the surrounding brightness may be calculated separately, and the display parameters such as display brightness, contrast ratio, character size of the display 101 may be adjusted according to the turbidity and the surrounding brightness. In FIG. 5A, when the processor 103 enables the light source 107 of the electronic device 100, the light receiver 109 receives the light beam emitted by the light source 107 and the ambient light refracted by the reflecting element 501 simultaneously, and at this moment, the light intensity of the light beam received by the light receiver 109 is $I_{R1}+I_{R2}$. When the processor 103 disables the light source 107 of the electronic device 100, the light intensity of the light beam received by the light receiver 109 is $I_{R2}$ because the light receiver 109 only receives the ambient light refracted by the reflecting element 501. Then, as long as the processor 103 calculates $I_{R1}+I_{R2}-I_{R2}=I_{R1}$, the light intensity $I_{R1}$ of the light beam singly received by light receiver 109 from the light source 107 may be acquired. Finally, the processor 103 may search the light intensity-turbidity correspondence table in the storage device 105 according to the light intensity $I_{R1}$, to acquire the turbidity of the location of the display 101 and acquire the surrounding brightness by light intensity $I_{R2}$ of the light beam received by the light receiver 109. Therefore, the processor may adjust the display parameters such as display brightness, contrast ratio, character size of the display 101 according to the turbidity and the surrounding brightness.

Figure 6A:
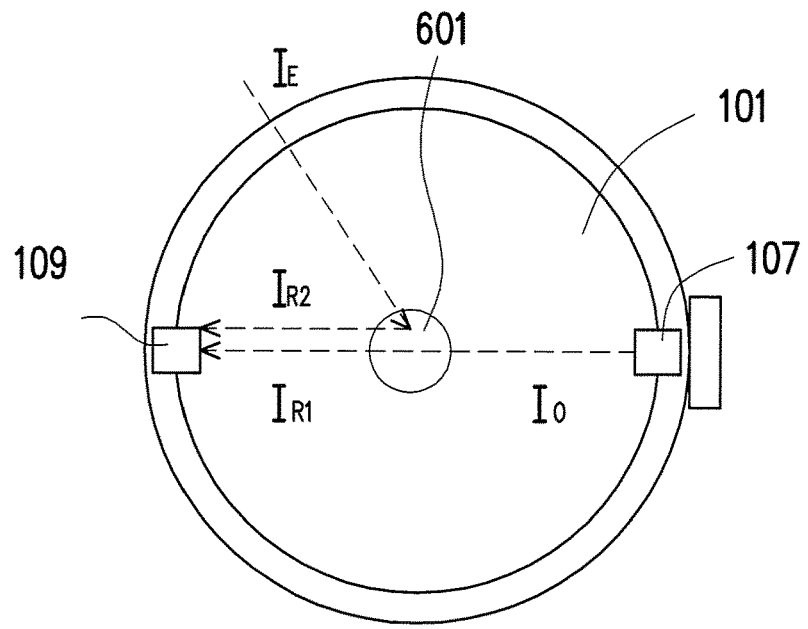
FIG. 6A and FIG. 6B are schematic top views of the electronic device according to another embodiment of the invention.
Figure 6B:
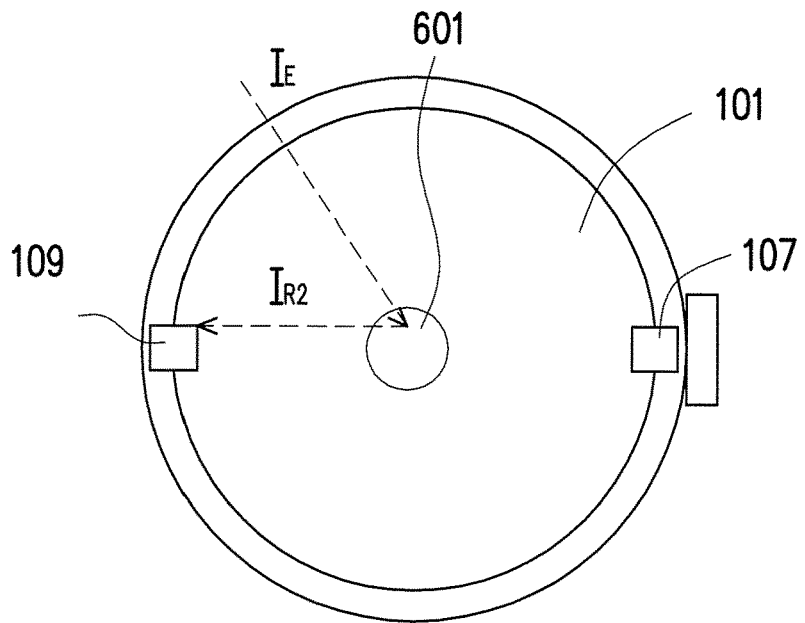

FIG. 6A and FIG. 6B are schematic top views of the electronic device according to another embodiment of the invention.

Referring to FIG. 6A and FIG. 6B, in the embodiment, the turbidity and the surrounding brightness may be calculated separately, and the display parameters such as display brightness, contrast ratio, character size of the display 101 may be adjusted separately according to the turbidity and the surrounding brightness. In FIG. 6A, when the processor 103 enables the light source 107 of the electronic device 100, the light receiver 109 receives the light beam emitted by the light source 107 and the ambient light refracted by the reflecting element 601 (such as a transflective mirror) simultaneously, and at this moment, the light intensity of the light beam received by the light receiver 109 is $I_{R1}+I_{R2}$. When the processor 103 disables the light source 107 of the electronic device 100, the light intensity of the light beam received by the light receiver 109 is $I_{R2}$ because the light receiver 109 only receives the ambient light refracted by the reflecting element 601. Then, as long as the processor 103 calculates $I_{R1}+I_{R2}-I_{R2}=I_{R1}$, the light intensity $I_{R1}$ of the light beam singly received by light receiver 109 from the light source 107 may be acquired. Finally, the processor 103 may search the light intensity-turbidity correspondence table in the storage device 105 according to the light intensity $I_{R1}$, to acquire the turbidity of the location of the display 101 and acquire the surrounding brightness by light intensity $I_{R2}$ of the light beam received by the light receiver 109 being. Therefore, the processor may adjust the display parameters such as display brightness, contrast ratio, character size of the display 101 according to the turbidity and the surrounding brightness.

Figure 7:
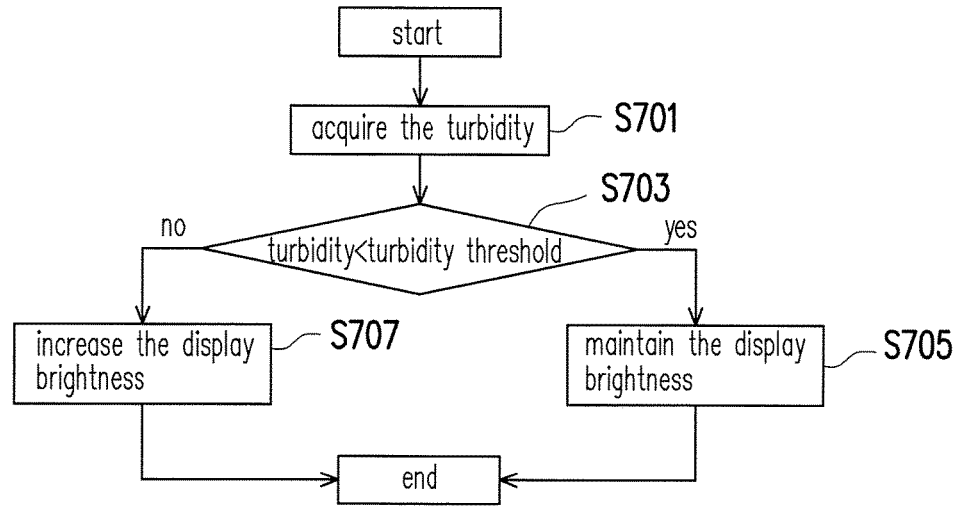
FIG. 7 is a flowchart illustrating the display parameter adjusting method according to an embodiment of the invention.

FIG. 7 is a flowchart illustrating the display brightness adjusting method according to an embodiment of the invention.

Referring to FIG. 7, in step S701, the processor 103 may search the light intensity-turbidity correspondence table in the storage device 105 according to the first light intensity $I_{R1}$ of the light beam received by the light receiver 109, to acquire the turbidity of the location of the display 101. In step S703, the processor 103 determines whether the turbidity is less than the turbidity threshold. If the turbidity is less than the turbidity threshold, then the processor 103 maintains the display brightness in step S705. If the turbidity is not less than the turbidity threshold, then the processor 103 increases the display brightness in step S707. It is noteworthy that the processor 103 may confirm the value of the display brightness needed to be increased by the display 101 through the built-in display brightness-turbidity correspondence table in the storage device 105.

Figure 8:
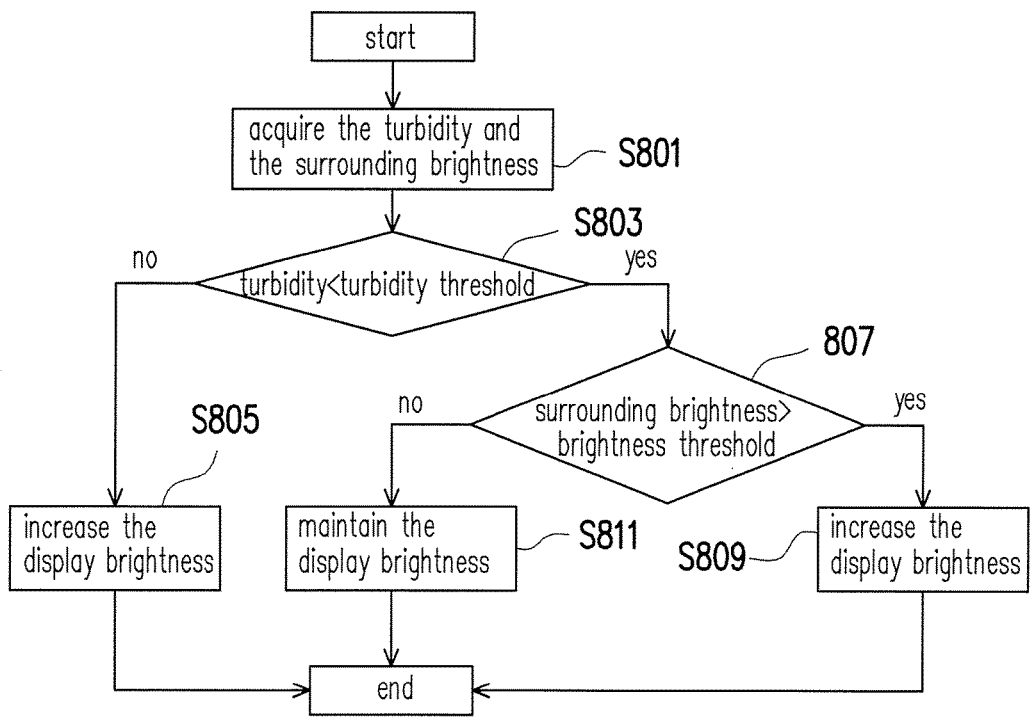
FIG. 8 is a flowchart illustrating the display parameter adjusting method according to another embodiment of the invention.

FIG. 8 is a flowchart illustrating the display brightness adjusting method according to another embodiment of the invention.

Referring to FIG. 8, in step S801, the processor 103 may search the light intensity-turbidity correspondence table in the storage device 105 according to the first light intensity $I_{R1}$ of the light beam received by the light receiver 109 to acquire the turbidity of the location of the display 101, and acquire the surrounding brightness according to the second light intensity $I_{R2}$. In step S803, the processor 103 determines whether the turbidity is less than the turbidity threshold. If the turbidity is not less than the turbidity threshold, then the processor 103 increases the display brightness in step S805. If the turbidity is less than the turbidity threshold, the processor 103 further determines whether the surrounding brightness is greater than the brightness threshold in step S807. If the surrounding brightness is greater than the brightness threshold, the processor 103 increases the display brightness in step S809. If the surrounding brightness is not greater than the brightness threshold, the processor 103 maintains the display brightness in step S811. It is noteworthy that the processor 103 may confirm the value of the display brightness needed to be increased by the display 101 through the built-in display brightness-turbidity correspondence table and the display brightness-surrounding brightness correspondence table in the storage device 105. In short, the display brightness is directly proportional to the turbidity and the surrounding brightness.

Though the display brightness is adjusted according to the turbidity and the surrounding brightness as illustrated in the present embodiment, the character size may also be adjusted by the method similar to the present embodiment in another embodiment. Specifically, in another embodiment, the processor 103 determines whether the turbidity is less than the turbidity threshold first. If the turbidity is not less than the turbidity threshold, then the processor 103 increases character size. If the turbidity is less than the turbidity threshold, the processor 103 further determines whether the surrounding brightness is greater than the brightness threshold. If the surrounding brightness is greater than the turbidity threshold, then the processor 103 increases the character size. If the surrounding brightness is not greater than the turbidity threshold, then the processor 103 maintains the character size.

Figure 9:
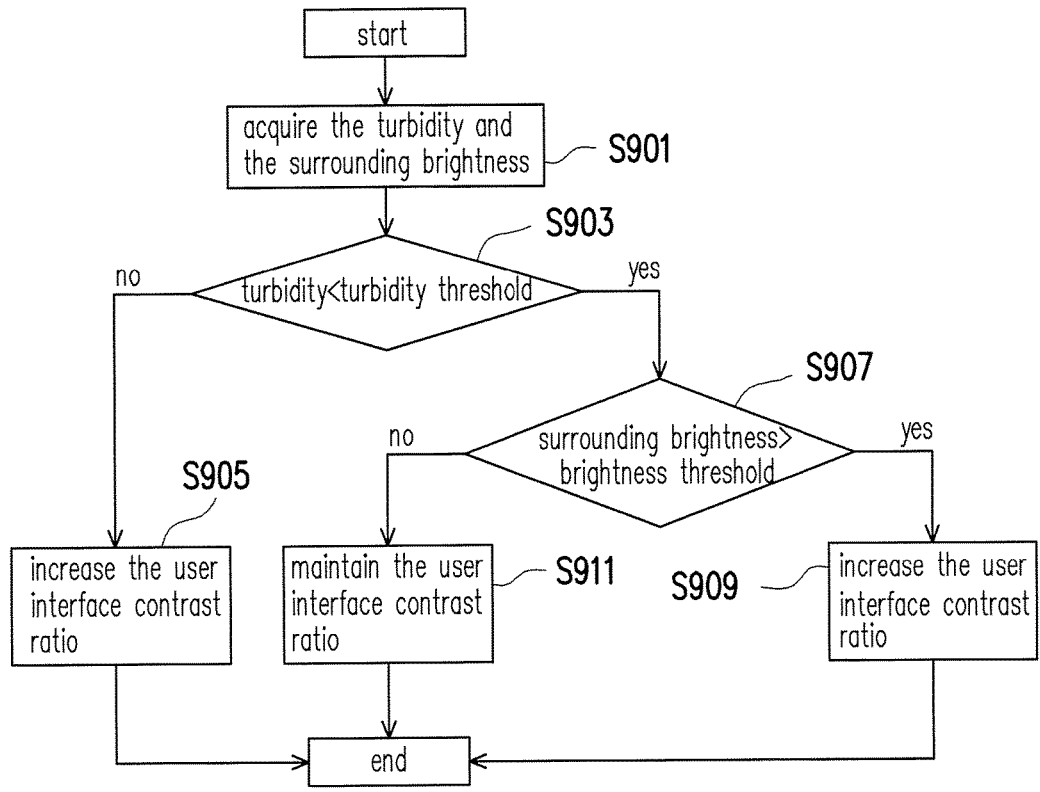
FIG. 9 is a flowchart illustrating the user interface contrast ratio adjusting method according to an embodiment of the invention.
Figure 10A:
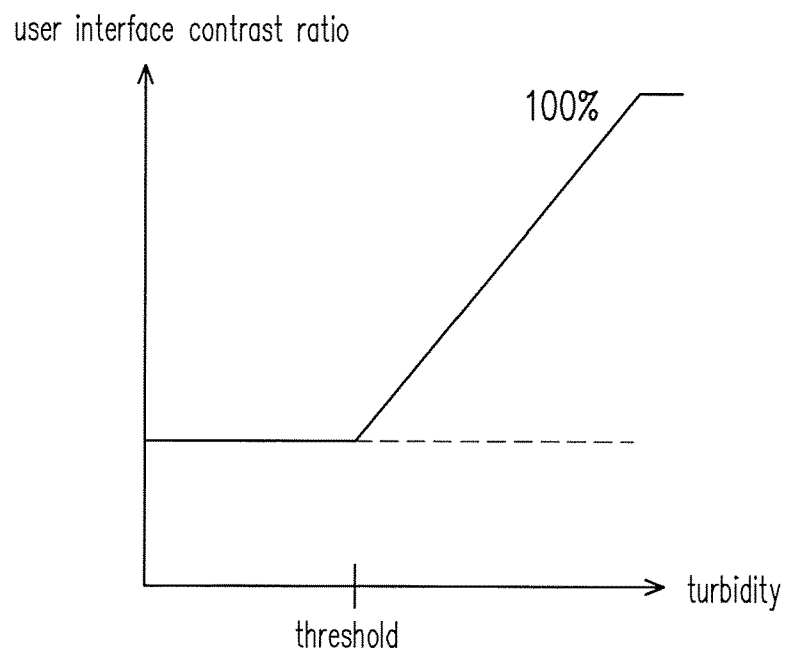
FIG. 10A and FIG. 10B are correlation diagrams of the user interface contrast ratio and turbidity and the surrounding brightness according to an embodiment of the invention.
Figure 10B:
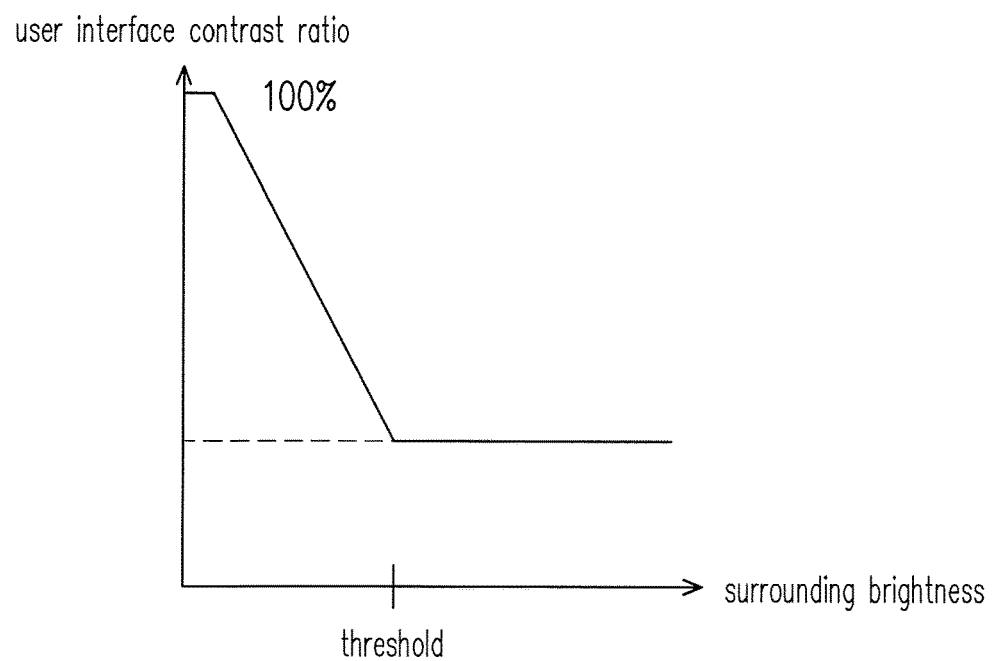

FIG. 9 is a flowchart illustrating the user interface contrast ratio adjusting method according to an embodiment of the invention. FIG. 10A and FIG. 10B are correlation diagrams of the user interface contrast ratio and turbidity and the surrounding brightness according to an embodiment of the invention.

Referring to FIG. 9, in step S901, the processor 103 may search the light intensity-turbidity correspondence table in the storage device 105 according to the first light intensity $I_{R1}$ of the light beam received by the light receiver 109 to acquire the turbidity of the location of the display 101, and acquire the surrounding brightness according to the second light intensity $I_{R2}$. In step S903, the processor 103 determines whether the turbidity is less than the turbidity threshold. If the turbidity is not less than the turbidity threshold, then the processor 103 increases the user interface contrast ratio in step S905. If the turbidity is less than the turbidity threshold, the processor 103 further determines whether the surrounding brightness is greater than the brightness threshold in step S907. If the surrounding brightness is greater than the brightness threshold, the processor 103 increases the user interface contrast ratio in step S909. If the surrounding brightness is not greater than the brightness threshold, the processor 103 maintains the user interface contrast ratio in step S911. It is noteworthy that the processor 103 may confirm the value of the user interface contrast ratio needed to be increased by the display 101 through the built-in user interface contrast ratio-turbidity correspondence table and the user interface contrast ratio-surrounding brightness correspondence table in the storage device 105.

For example, in FIG. 10A, when the turbidity is greater than the threshold, the processor 103 increases the user interface contrast ratio. In FIG. 10B, when the surrounding brightness is less than the threshold, the processor 103 increases the user interface contrast ratio. In short, the user interface contrast ratio is directly proportional to the turbidity and inversely proportional to the surrounding brightness.

It is noteworthy that the HSV color space is adopted in the present embodiment, and the HSV color space includes hue (H), saturation (S), and value (V). The processor 103 may define the primary color and the contrast color first. For example, the primary color may be defined as (H1, S1, V1) and the contrast color may be defined as (H2, S2, V2), wherein H1=225°, H2=45°, S1=S2=50%, V1=V=100% may be configured, then, the primary color (H1, S1, V1) is designated as user interface background color, and the contrast color (H2, S2, V2) is designated as user interface background color. Then, the processor 103 may adjust the contrast ratio by adjusting the saturation of the primary color and the contrast color. For example, the primary color (H1, S1, V1) is changed into (H1, S1', V1), and the contrast color (H2, S2, V2) is changed into (H2, S2 ', V2). If (S1'+S2')/2>(S1+S2)/2, then the contrast ratio of the changed primary color and the contrast color are increased. If (S1'+S2')/2=

(S1+S2)/2, then the contrast ratio of the changed primary color and the contrast color are unchanged. Although the HSV color space is used as an illustration in the embodiment, the invention is not limited thereto. In another embodiment, color spaces such as RGB, HLS, CIE may be adopted, for example.

Though the user color contrast ratio is adjusted according to the turbidity and the surrounding brightness as illustrated in the present embodiment, the character contrast ratio may be adjusted by the method similar to the present embodiment in another embodiment. Specifically, in another embodiment, the processor 103 determines whether the turbidity is less than the turbidity threshold first. If the turbidity is not less than the turbidity threshold, then the processor 103 increases character contrast ratio. If the turbidity is less than the turbidity threshold, the processor 103 further determines whether the surrounding brightness is greater than the brightness threshold. If the surrounding brightness is greater than the turbidity threshold, then the processor 103 increases the character contrast ratio. If the surrounding brightness is not greater than the turbidity threshold, then the processor 103 maintains the character contrast ratio.

Figure 11:
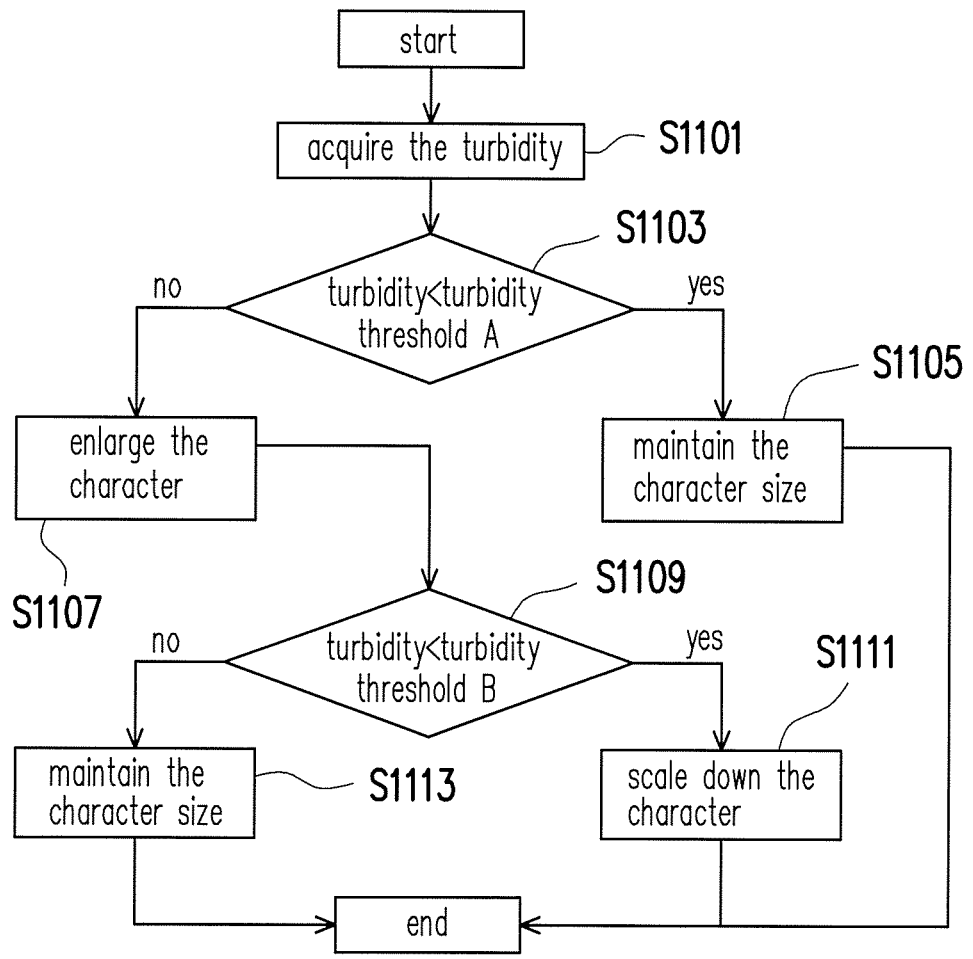
FIG. 11 is a flowchart illustrating the character size adjusting method according to an embodiment of the invention.

FIG. 11 is a flowchart illustrating the character size adjusting method according to an embodiment of the invention.

Referring to FIG. 11, in step S1101, the processor 103 may search the light intensity-turbidity correspondence table in the storage device 105 according to the first light intensity $I_{R1}$ of the light beam received by the light receiver 109, to acquire the turbidity of the location of the display 101. In step S1103, the processor 103 determines whether the turbidity is less than the turbidity threshold A. If the turbidity is less than the turbidity threshold A, then the processor 103 maintains the character size in step S1105. If the turbidity is not less than the turbidity threshold A, the processor 103 enlarges the character in step S1107 and further determines whether the turbidity is less than the turbidity threshold B in step S1109. If the turbidity is less than the turbidity threshold B, the processor 103 scales down the character in step S1111. If the turbidity is not less than the turbidity threshold B, the processor 103 maintains the character size in step S1113. It is noteworthy that the turbidity threshold B is greater than the turbidity threshold A. So, when the turbidity is greater than the turbidity threshold B, a high level of turbidity is represented. When the turbidity is between the turbidity threshold B and the turbidity threshold A, a normal level of turbidity is represented. When the turbidity is smaller than the turbidity threshold A, the clearness is represented. In addition, the processor 103 may confirm the character size needed to be enlarged or scaled down by the display 101 through the built-in character size-turbidity correspondence table in the storage device 105.

Figure 12:
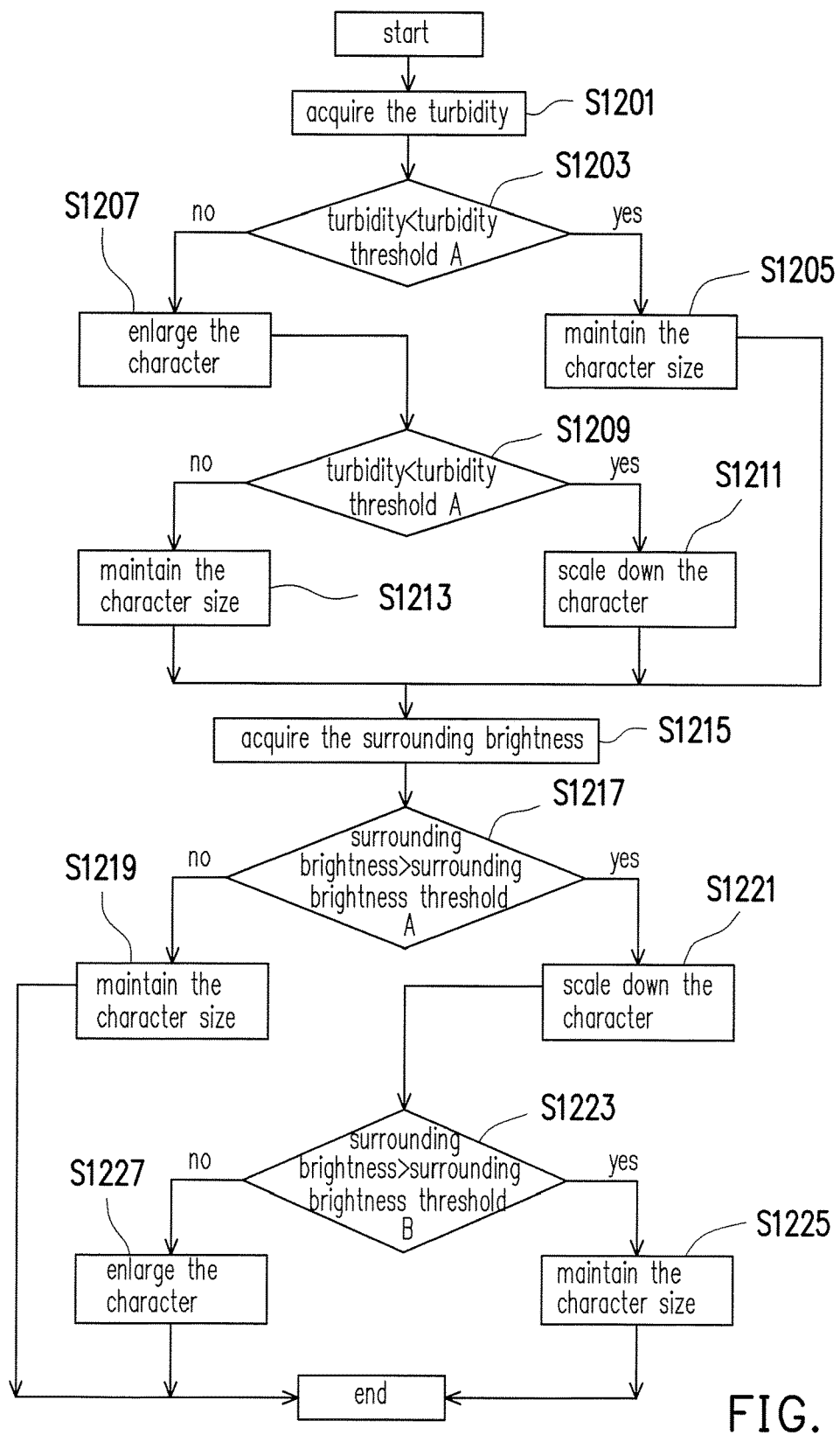
FIG. 12 is a flowchart illustrating the character size adjusting method according to another embodiment of the invention.
Figure 13A:
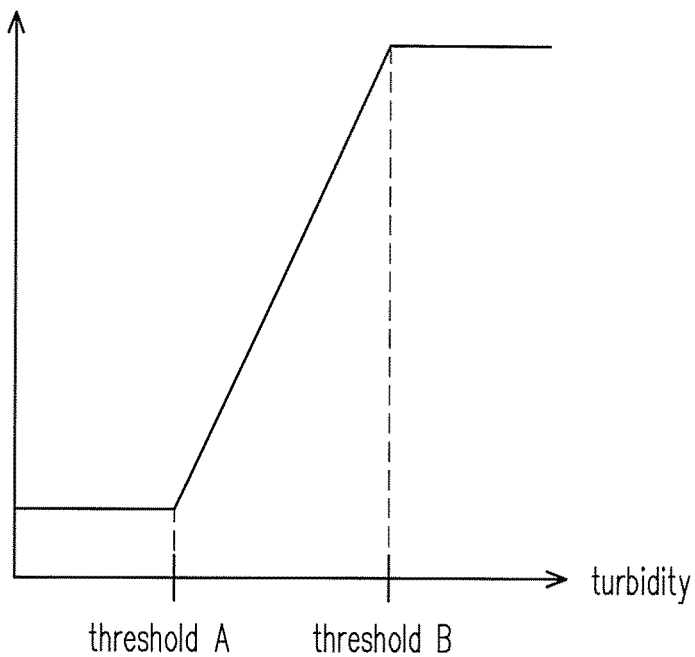
FIG. 13A and FIG. 13B are correlation diagrams of the character size and turbidity and the surrounding brightness according to another embodiment of the invention.
Figure 13B:
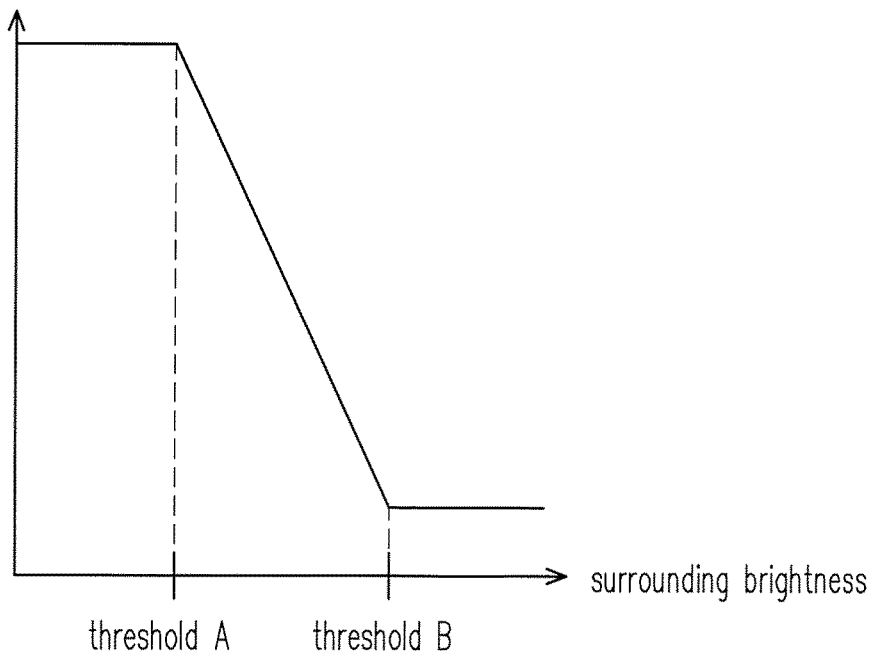

FIG. 12 is a flowchart illustrating the character size adjusting method according to another embodiment of the invention. FIG. 13A and FIG. 13B are correlation diagrams of the character size and turbidity and the surrounding brightness according to another embodiment of the invention.

Referring to FIG. 12, in step S1201, the processor 103 may search the light intensity-turbidity correspondence table in the storage device 105 according to the first light intensity $I_{R1}$ of the light beam received by the light receiver 109, to acquire the turbidity of the location of the display 101. In step S1203, the processor 103 determines whether the turbidity is less than the turbidity threshold A. If the turbidity is less than the turbidity threshold A, then the processor 103 maintains the character size in step S1205. If the turbidity is not less than the turbidity threshold A, the processor 103 enlarges the character in step S1207 and further determines whether the turbidity is less than the turbidity threshold B in step S1209. If the turbidity is less than the turbidity threshold B, the processor 103 scales down the character in step S1211. If the turbidity is not less than the turbidity threshold B, the processor 103 maintains the character size in step S1213. It is noteworthy that the turbidity threshold B is greater than the turbidity threshold A. So, when the turbidity is greater than the turbidity threshold B, a high level of turbidity is represented. When the turbidity is between the turbidity threshold B and the turbidity threshold A, a normal level of turbidity is represented. When the turbidity is smaller than the turbidity threshold A, the clearness is represented. In addition, the processor 103 may confirm the character size needed to be enlarged or scaled down by the display 101 through the built-in character size-turbidity correspondence table in the storage device 105.

Then, in step S1215, the processor 103 acquires the surrounding brightness according to the second light intensity $I_{R2}$. In step S1217, the processor 103 determines whether the surrounding brightness is greater than the surrounding brightness threshold A. If the surrounding brightness is greater than the surrounding brightness threshold A, then the processor 103 maintains the character size in step S1219. If the surrounding brightness is not greater than the surrounding brightness threshold A, the processor 103 scales down the character in step S1221 and further determines whether the surrounding brightness is greater than the surrounding brightness threshold B in step S1223. If the surrounding brightness is greater than the surrounding brightness threshold B, the processor 103 maintains the character size in step S1225. If the surrounding brightness is not greater than the surrounding brightness threshold B, the processor 103 enlarges the character size in step S1227. It is noteworthy that the surrounding brightness threshold B is greater than the surrounding brightness threshold A. So, when the surrounding brightness is greater than the surrounding brightness threshold B, a bright surrounding brightness is represented. When the surrounding brightness is between the surrounding brightness threshold B and the surrounding brightness threshold A, a normal surrounding brightness is represented. When the surrounding brightness is smaller than the surrounding brightness threshold A, a dark surrounding brightness is represented. In addition, the processor 103 may confirm the character size needed to be enlarged or scaled down by the display 101 through the built-in surrounding brightness-turbidity correspondence table in the storage device 105.

In FIG. 13A, for example, when the turbidity is between the turbidity threshold A and the turbidity threshold B, the processor 103 enlarges the character size as the turbidity is increased. In FIG. 13B, when the surrounding brightness is between the surrounding brightness threshold A and the surrounding brightness threshold B, the processor 103 scales down the character size as the surrounding brightness is increased. In short, the character size is directly proportional to the turbidity and inversely proportional to the surrounding brightness.

Figure 14:
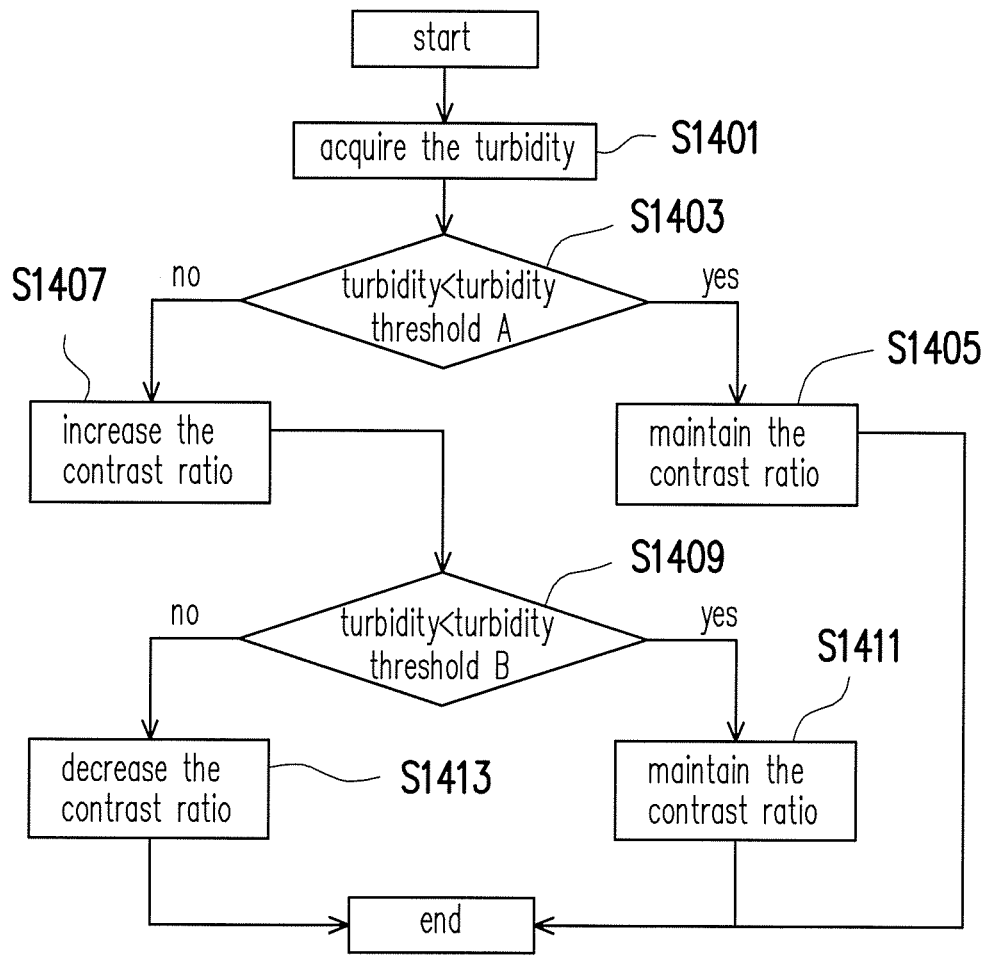
FIG. 14 is a flowchart illustrating the character contrast ratio adjusting method according to an embodiment of the invention.

FIG. 14 is a flowchart illustrating the character contrast ratio adjusting method according to an embodiment of the invention.

Referring to FIG. 14, in step S1401, the processor 103 may search the light intensity-turbidity correspondence table in the storage device 105 according to the first light intensity $I_{R1}$ of the light beam received by the light receiver 109, to acquire the turbidity of the location of the display 101. In step S1403, the processor 103 determines whether the turbidity is less than the turbidity threshold A. If the turbidity is less than the turbidity threshold A, then the processor 103 maintains the character contrast ratio in step S1405. If the turbidity is not less than the turbidity threshold A, the processor 103 increases the character contrast ratio in step S1407 and further determines whether the turbidity is less than the turbidity threshold B in step S1409. If the turbidity is less than the turbidity threshold B, the processor 103 decreases the character contrast ratio in step S1411. If the turbidity is not less than the turbidity threshold B, the processor 103 maintains the character contrast ratio in step S1413. It is noteworthy that the turbidity threshold B is greater than the turbidity threshold A. So, when the turbidity is greater than the turbidity threshold B, a high level of turbidity is represented. When the turbidity is between the turbidity threshold B and the turbidity threshold A, a no mal level of turbidity is represented. When the turbidity is smaller than the turbidity threshold A, the clearness is represented. In addition, the processor 103 may confirm the character contrast ratio needed to be increased or decreased by the display 101 through the built-in character contrast ratio-turbidity correspondence table in the storage device 105.

Figure 15:
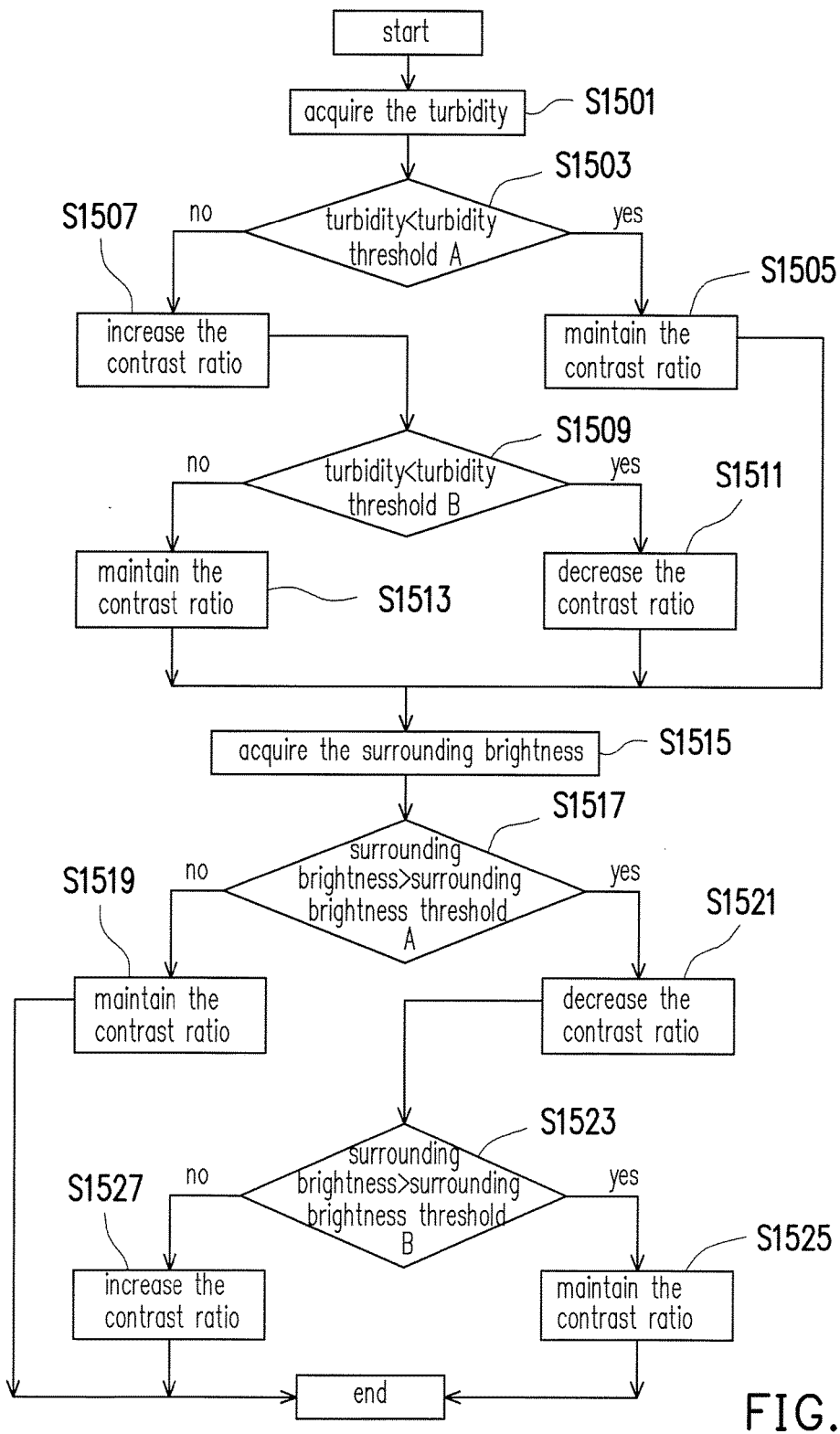
FIG. 15 is a flowchart illustrating the character contrast ratio adjusting method according to another embodiment of the invention.
Figure 16A:
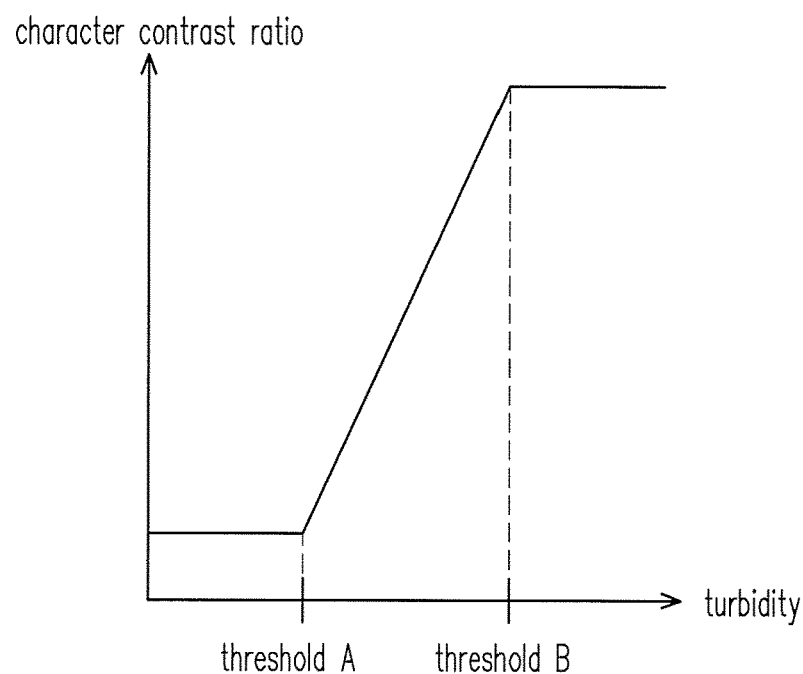
FIG. 16A and FIG. 16B are correlation diagrams of the character contrast ratio and turbidity and the surrounding brightness according to another embodiment of the invention.
Figure 16B:
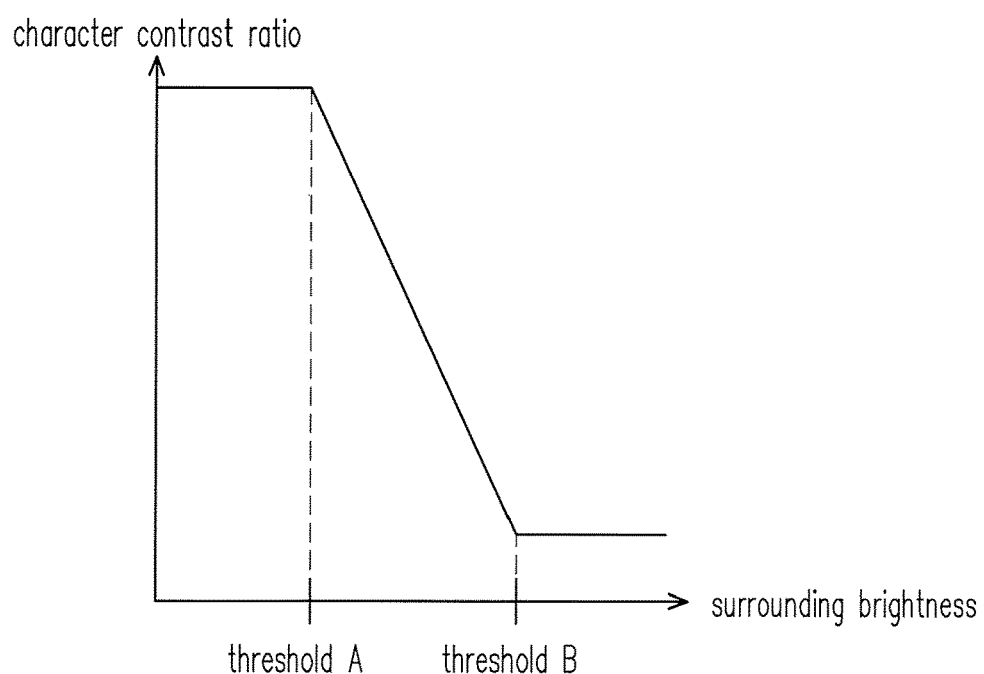

FIG. 15 is a flowchart illustrating the character contrast ratio adjusting method according to another embodiment of the invention. FIG. 16A and FIG. 16B are correlation diagrams of the character contrast ratio and turbidity and the surrounding brightness according to another embodiment of the invention.

Referring to FIG. 15, in step S1501, the processor 103 may search the light intensity-turbidity correspondence table in the storage device 105 according to the first light intensity $I_{R1}$ of the light beam received by the light receiver 109, to acquire the turbidity of the location of the display 101. In step S1503, the processor 103 determines whether the turbidity is less than the turbidity threshold A. If the turbidity is less than the turbidity threshold A, then the processor 103 maintains the character contrast ratio in step S1505. If the turbidity is not less than the turbidity threshold A, the processor 103 increases the character contrast ratio in step S1507 and further determines whether the turbidity is less than the turbidity threshold B in step S1509. If the turbidity is less than the turbidity threshold B, the processor 103 decreases the character contrast ratio in step S1511. If the turbidity is not less than the turbidity threshold B, the processor 103 maintains the character contrast ratio in step S1513. It is noteworthy that the turbidity threshold B is greater than the turbidity threshold A. So, when the turbidity is greater than the turbidity threshold B, a high level of turbidity is represented. When the turbidity is between the turbidity threshold B and the turbidity threshold A, a normal level of turbidity is represented. When the turbidity is smaller than the turbidity threshold A, the clearness is represented. In addition, the processor 103 may confirm the character contrast ratio needed to be increased or decreased by the display 101 through the built-in character contrast ratio-turbidity correspondence table in the storage device 105.

Then, in step S1515, the processor 103 acquires the surrounding brightness according to the second light intensity $I_{R2}$. In step S1517, the processor 103 determines whether the surrounding brightness is greater than the surrounding brightness threshold A. If the surrounding brightness is greater than the surrounding brightness threshold A, then the processor 103 maintains the character contrast ratio in step S1519. If the surrounding brightness is not greater than the surrounding brightness threshold A, the processor 103 decreases the character contrast ratio in step S1521 and further determines whether the surrounding brightness is greater than the surrounding brightness threshold B in step S1523. If the surrounding brightness is greater than the surrounding brightness threshold B, then the processor 103 maintains the character contrast ratio in step S1525. If the surrounding brightness is not greater than the surrounding brightness threshold B, then the processor 103 increases the character contrast ratio in step S1527. It is noteworthy that the surrounding brightness threshold B is greater than the surrounding brightness threshold A. So, when the surrounding brightness is greater than the surrounding brightness threshold B, a bright surrounding brightness is represented. When the surrounding brightness is between the surrounding brightness threshold B and the surrounding brightness threshold A, a normal surrounding brightness is represented. When the surrounding brightness is smaller than the surrounding brightness threshold A, a dark surrounding brightness is represented. In addition, the processor 103 may confirm the character contrast ratio needed to be increased or decreased by the display 101 through the built-in character contrast ratio-surrounding brightness correspondence table in the storage device 105.

In FIG. 16A, when the turbidity is between the turbidity threshold A and the turbidity threshold B, the processor 103 increases the character contrast ratio as the turbidity is increased, for example. In FIG. 16B, when the surrounding brightness is between the surrounding brightness threshold A and the surrounding brightness threshold B, the processor 103 decreases the character contrast ratio as the surrounding brightness is increased. In short, the character contrast ratio is directly proportional to the turbidity and inversely proportional to the surrounding brightness. Specifically, when the character contrast ratio is low, the processor 103 may set the background color to light blue and set the character color to white. And, when the character contrast ratio is high, the processor 103 may set the background color to dark blue and set the character color to yellow. In such a way, the user may clearly identify the content on the display 101 in various turbidity and surrounding brightness.

Based on the above, the display parameter adjusting method and the electronic device employing the method in the invention may calculate the turbidity of the electronic device under the water surface according to the emission of the light beam by the light source of the electronic device to the light receiver, calculate the surrounding brightness according to the refraction of the ambient light to the light receiver by the reflecting element, and dynamically adjust the display parameter of the display though the turbidity and the surrounding brightness. Particularly, the turbidity is a primary considered parameter in the invention along with the aid of the surrounding brightness parameter to adjust the display parameters such as display brightness, user interface contrast ratio, character size, and character contrast ratio are adjusted such that the user may clearly identify the content of the display of the electronic device when the turbidity and the surrounding brightness of the environment under the water surface are changed.

It will be apparent to those skilled in the art that various modifications and variations may be made to the disclosed embodiments without departing from the scope or spirit of the invention. In view of the foregoing, it is intended that the invention covers modifications and variations provided that they fall within the scope of the following claims and their equivalents.

What is claimed is:

1. A display parameter adjusting method adapted to an electronic device, the electronic device comprises a display, a processor, a light source and a light receiver, the display parameter adjusting method comprises:
   disposing the light source and the light receiver on a rim of a displaying surface of the display;
   disposing a reflecting element on a center of the displaying surface;
   emitting a light beam to the light receiver by the light source, wherein the light beam propagates through the reflecting element;
   the processor calculating a turbidity of a location of the display according to a first light intensity of the light beam received by the light receiver, wherein a propagation direction of the light beam emitted by the light source is parallel to the displaying surface of the display, and the location is located beneath a water surface; and
   the processor adjusting a display parameter of the display according to the turbidity.

2. The display parameter adjusting method according to claim 1, wherein the display parameter adjusting method further comprises:
   the processor calculating a surrounding brightness of the location of the display; and
   the processor adjusting the display parameter of the display according to the turbidity and the surrounding brightness.

3. The display parameter adjusting method according to claim 2, wherein the electronic device further comprises the reflecting element disposed on the display, and a step of calculating the surrounding brightness of the location of the display comprises:
   refracting an ambient light to the light receiver through the reflecting element; and
   the processor calculating the surrounding brightness according to a second light intensity of the refracted ambient light received by the light receiver.

4. The display parameter adjusting method according to claim 3, wherein the reflecting element is disposed on the propagation direction of the light beam, and the reflecting element is a transflective mirror.

5. The display parameter adjusting method according to claim 1, wherein the light source is a directional light source.

6. The display parameter adjusting method according to claim 1, wherein the display parameter comprises a display brightness, and when the turbidity is not less than a turbidity threshold, the processor increases the display brightness.

7. The display parameter adjusting method according to claim 6, wherein when the turbidity is less than the turbidity threshold, the processor further determines whether the surrounding brightness is greater than a brightness threshold, and when the surrounding brightness is greater than the brightness threshold, the processor increases the display brightness.

8. The display parameter adjusting method according to claim 1, wherein the display parameter comprises a character size, when the turbidity is not less than a turbidity threshold, the processor enlarges the character size.

9. The display parameter adjusting method according to claim 8, wherein when the turbidity is less than the turbidity threshold, the processor further determines whether the surrounding brightness is greater than a brightness threshold, and when the surrounding brightness is greater than the brightness threshold, the processor scales down the character size.

10. The display parameter adjusting method according to claim 1, wherein the display parameter comprises a contrast ratio, and when the turbidity is not less than a turbidity threshold, the processor increases the contrast ratio.

11. The display parameter adjusting method according to claim 10, wherein when the turbidity is less than the turbidity threshold, the processor further determines whether the surrounding brightness is greater than a brightness threshold, and when the surrounding brightness is greater than the brightness threshold, the processor increases the contrast ratio.

12. The display parameter adjusting method according to claim 10, wherein the contrast ratio comprises a user interface contrast ratio and a character contrast ratio.

13. An electronic device, comprising:
   a display;
   a processor, coupled with the display;
   a light source, coupled with the processor; and
   a light receiver, coupled with the processor,
   wherein the processor instructs the light source to emit a light beam to the light receiver,
   wherein the processor calculates a turbidity of a location of the display according to a first light intensity of the light beam received by the light receiver, wherein a propagation direction of the light beam emitted by the light source is parallel to a displaying surface of the display, and the location is located beneath a water surface,
   wherein the processor adjusts a display parameter of the display according to the turbidity,
   wherein the light source and the light receiver are disposed on a rim of the displaying surface of the display,
   wherein a reflecting element is disposed on a center of the displaying surface,
   wherein the light beam propagates through the reflecting element.

14. The electronic device according to claim 13, wherein the processor calculates a surrounding brightness of the location of the display,
   wherein the processor adjusts the display parameter of the display according to the turbidity and the surrounding brightness.

15. The electronic device according to claim 14, wherein the electronic device further comprises the reflecting element disposed on the display, wherein the reflecting element refracts an ambient light to the light receiver,
   wherein the processor calculates the surrounding brightness according to a second light intensity of the refracted ambient light received by the light receiver.

16. The electronic device according to claim 15, wherein the reflecting element is disposed on the propagation direction of the light beam, and the reflecting element is a transflective mirror.

17. The electronic device according to claim 13, wherein the light source is a directional light source.

18. The electronic device according to claim 13, wherein the display parameter comprises a display brightness, and when the turbidity is not less than a turbidity threshold, the processor increases the display brightness.

19. The electronic device according to claim 18, wherein when the turbidity is less than the turbidity threshold, the processor further determines whether the surrounding brightness is greater than a brightness threshold, and when the surrounding brightness is greater than the brightness threshold, the processor increases the display brightness.

20. The electronic device according to claim 13, wherein the display parameter comprises a character size, when the turbidity is not less than a turbidity threshold, the processor enlarges the character size.

21. The electronic device according to claim 20, wherein when the turbidity is less than the turbidity threshold, the processor further determines whether the surrounding brightness is greater than a brightness threshold, and when the surrounding brightness is greater than the brightness threshold, the processor scales down the character size.

22. The electronic device according to claim 13, wherein the display parameter comprises a contrast ratio, and when the turbidity is not less than a turbidity threshold, the processor increases the contrast ratio.

23. The electronic device according to claim 22, wherein when the turbidity is less than the turbidity threshold, the processor further determines whether the surrounding brightness is greater than a brightness threshold, and when the surrounding brightness is greater than the brightness threshold, the processor increases the contrast ratio.

24. The electronic device according to claim 22, wherein the contrast ratio comprises a user interface contrast ratio and a character contrast ratio.

* * * * *